United States Patent [19]
Jacobs et al.

[11] Patent Number: 4,658,664
[45] Date of Patent: Apr. 21, 1987

[54] RACK AND PINION ASSEMBLY

[75] Inventors: Gary R. Jacobs; Paul J. Haeck, both of Indianapolis, Ind.

[73] Assignee: Von Duprin, Inc., Indianapolis, Ind.

[21] Appl. No.: 772,885

[22] Filed: Sep. 5, 1985

[51] Int. Cl.$^4$ ............................................. F16H 1/20
[52] U.S. Cl. ..................................... 74/422; 74/33; 74/810; 292/172; 292/142
[58] Field of Search ................... 292/172, 142, 169.22; 74/810, 812, 32, 33, 34, 422

[56] References Cited
U.S. PATENT DOCUMENTS

| | | | |
|---|---|---|---|
| 768,138 | 8/1904 | Northrup | 74/32 |
| 2,771,782 | 11/1956 | Darby | 74/32 |
| 4,333,324 | 6/1982 | Dietrich et al. | 292/172 X |

Primary Examiner—Andrew V. Kundrat
Assistant Examiner—Joseph A. Fischetti
Attorney, Agent, or Firm—Bernard J. Murphy

[57] ABSTRACT

The pinion is of two-piece construction, the two pieces being identical and nestably mated to define a recess, therebetween, which is interrupted by abutments, and which confines an abutment-engaging pin. Each piece has a plurality of teeth projecting therefrom, and the pieces are so mated that the teeth pluralities project form opposite sides of the formed pinion. A generally U-shaped rack, having teeth formed on the confronting surfaces of the parallel limbs thereof, is in mesh with the pinion, and the pin penetrates an input shaft upon which the pinion is mounted. As the shaft is turned in one direction, the pin drivingly engages the abutments of only one pinion piece, to cause the teeth of the latter to drive the rack in one, given direction. Too, if the shaft is turned in the opposite direction, the pin engages the abutments of only the other pinion piece, to cause its teeth to drive the rack in the same, one, given direction.

15 Claims, 5 Drawing Figures

RACK AND PINION ASSEMBLY

This invention pertains to rack and pinion assemblies, and in particular to such an assembly which is novel in that the rack moves in only one direction, no matter in what direction the pinion turns.

Door trim, as that term is used by those knowledgeable about, and skilled in, door hardware, means those structures which transform the rotational motion of a door knob into linear (and, perhaps vertical) motion. It is such linear motion which is used in a panic exit device, or a mortise lock, to retract the latchbolt. In an effort to reduce the amount of torque required to rotate a door knob, door trim, featuring a rack and pinion gear system, was found to have an advantage over the existing trim.

The mechanical advantage of a rack and pinion system is greater than that of the known or standard, doorknob-type trim. A rack and pinion results in approximately a thirty percent reduction in the torque required to turn the door knob. The rack and pinion design also allows for a better ratio of knob rotation to linear displacement of an associated, door latch, lift member.

In a conventional rack and pinion gear system, of course, the direction of rack displacement is a function of the direction of rotation of the pinion gear. However, in the design of door trim, it is necessary for the rack displacement to always be in the same direction, independent of direction of pinion gear (i.e. door knob) rotation.

It is an object of this invention to set forth a rack and pinion assembly in which the rack translates in only one direction although an input shaft of the assembly rotates in clockwise and/or counter-clockwise directions.

It is particularly an object of this invention to define a rack and pinion assembly comprising a guide; and a rack slidably engaged with said guide; wherein said guide comprises means for constraining said rack to linear motion thereof relative to said guide; pinion means drivingly engaged with said rack, for causing linear translation of said rack coincident with rotation of said pinion means; a shaft, rotatable in about an axis in clockwise and counter-clockwise directions, for causing rotation of said pinion means coincident with rotation of said shaft; and means coupling said shaft and said pinion means together for imparting any rotation of said shaft to said pinion means; wherein said pinion means and said coupling means comprise means cooperative for causing said rack to translate in only one direction in response to rotation of said shaft in (a) a clockwise direction, and/or (b) a counter-clockwise direction.

Further objects of this invention, as well as the novel features thereof, will become more apparent by reference to the following description taken in conjunction with the accompanying figures, in which:

FIG. 4 shows the rack and a slider in an exploded, perspective illustration; and FIG. 5 shows an elevational view of a portion of a door, partly cut away, with the door knob, latch bolt, the aforesaid slider, and the rack and pinion assembly incorporated therein.

Figure 1:
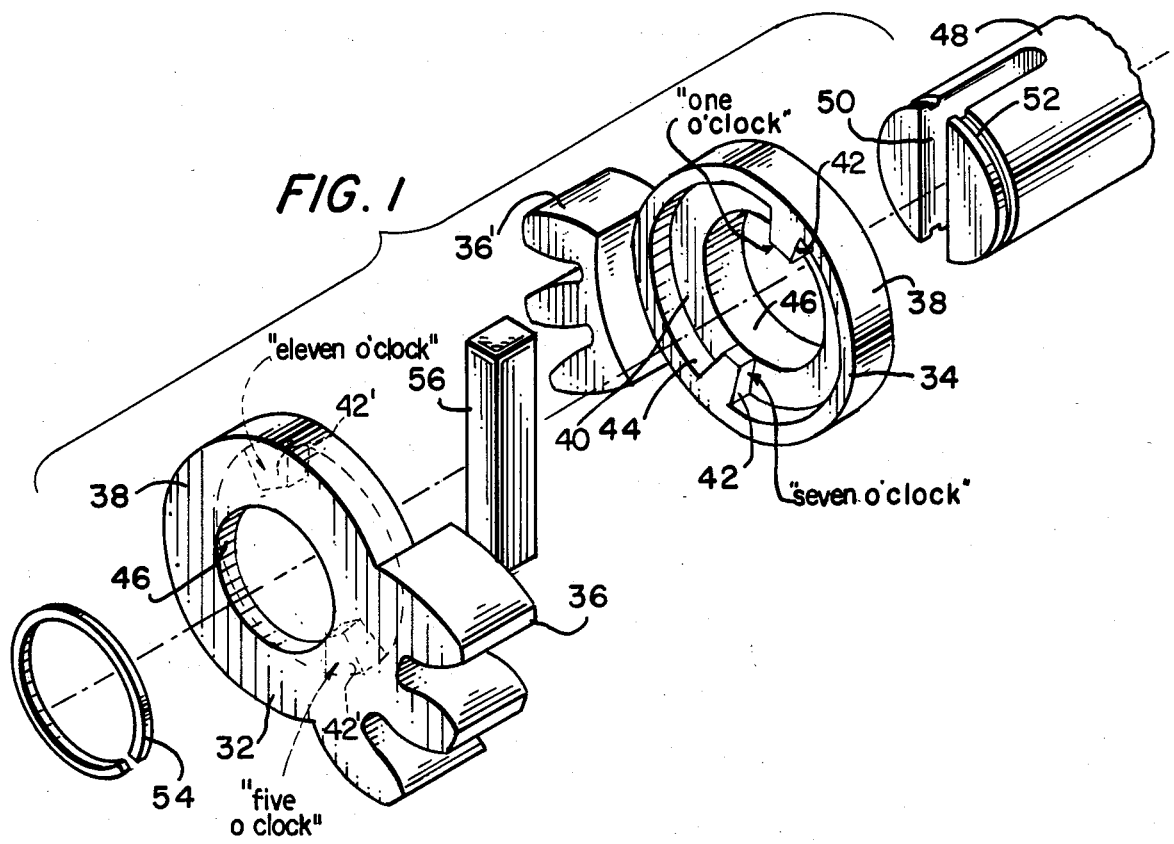
FIG. 1 is an exploded view, in perspective, of an embodiment of the two-piece gear, and shaft, of the invention.

As shown in the figures, the novel rack and pinion assembly 10 comprises a two-piece pinion 12 and a one-piece rack 14. The rack 14 comprises a substantially U-shaped element having a piece of substantially parallel limbs 16 and 18 which are bridged or joined together by an integral web 20. The limbs 16 and 18 have mutually confronting surfaces 16a and 18a with gear-type teeth formed thereon. The rack 14 is slidably disposed between walls 22 and 24 of a guide. Between an upper bearing surface 26, and lateral shoulders 28 of the rack 14, are a pair of compression springs 30. Springs 30 urge the rack 14 to assume the normal or at rest disposition shown in FIG. 2.

The pinion 12, as earlier noted, is of two pieces 32 and 34. Each of the pieces 32 and 34 comprises an annulus having a plurality of outwardly extending teeth formed thereon. The pieces 32 and 34 mutually nest together to form a pinion gear in which the aforesaid pluralities of teeth extend outwardly therefrom at substantially opposite sides thereof. The pinion pieces 32 and 34 have teeth sections 36 and 36', respectively, which are of twice the thickness of other, integral and annular sections 38, of the pieces 32 and 34, from which the teeth sections 36 and 36' project. The sections 38 are set in engaging juxtaposition and, consequently, the thus-engaged pinion pieces 32 and 34 define one pinion 12 of the aforesaid thickness of teeth sections 36 and 36.

Pieces 32 and 34 are identical, except that, in the assembly 10, and as can be seen in FIG. 1, one is inverted, or reversed, as compared to the other.

Each annular section 38 has a substantially annular recess 40 formed therein, however, the recess 40 is interrupted by a pair of abutments 42 of pinion piece 34, and abutments 42' of pinion piece 32. In each pinion piece the abutments 42 or 42' extend inwardly from a peripheral wall 44 of the recess. The abutments 42 and 42 are on opposite sides of each respective recess 40, and the annular sections 38 have circular apertures 46 formed therein.

A shaft 48, having a slot 50 formed in an end thereof, and having a circumferential groove 52 thereabout, receives the pinion 12 (i.e., the mated pieces 32 and 34) rotatably thereon, and a resilient retaining ring 54, receivable in the groove 52, secures the pinion 12 on the shaft 48. However, before the pinion 12 is emplaced on the shaft 48, it receives and confines a pin 56. Opposite ends of the pin 56, which has a thickness of twice the depth of the recesses 40, abut against, and fit just between, pairs of proximate abutments 42 and 42, and lodge in the recesses 40. Accordingly, with abutments 42 of the underlying (as viewed in FIGS. 2 and 3) annular section 38 of pinion piece 34 at "one o'clock" and "seven o'clock" dispositions, and the abutments 42' of the other, foremost annular section 38 of pinion piece 32 at "eleven o'clock" and "five o'clock" dispositions, the pin 56 nests therebetween in a vertical attitude, and is set in the shaft slot 50.

Now, upon the shaft 48 being torqued in driving rotation thereof by a door knob (as subsequently described) in the clockwise direction (relative to the plane of FIGS. 2 and 3) the abutments 42 of the underlying section 38 of pinion piece 34 (i.e. those at "one o'clock" and "seven o'clock") are engaged by the ends of the pin 56 and cause that underlying section 38 to rotate in the clockwise direction. As a consequence the teeth 36 thereof being in mesh with the teeth of surface 16a of the rack 14, the rack is moved upwardly against the bias of the springs 30. In this action, the ends of the pin 56 rotate away from the abutments 42' ("eleven o'clock, five o'clock") of the foremost section 38 of pinion piece 32. Even so, as the teeth 36 of the latter section 38 are in mesh with the teeth of surface 18a off the rack 14, the elevation of the rack causes the latter section 38 to rotate, on the shaft, in a counter-clockwise direction.

Figure 2:
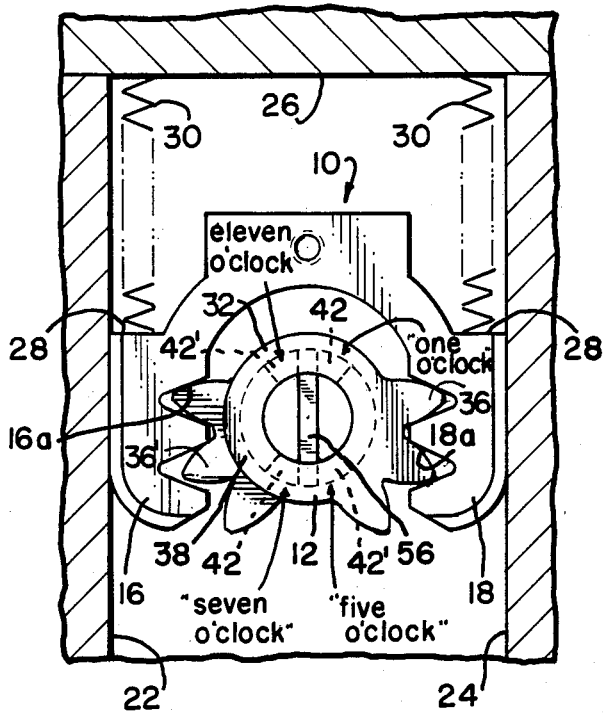
FIG. 2 is a side elevational view of the novel assembly, comprising the FIG. 1 gear and shaft and shown associated with a rack, guide, bearing surface, and springs, the same comprising the best mode of carrying out the invention contemplated by the inventors.
Figure 3:
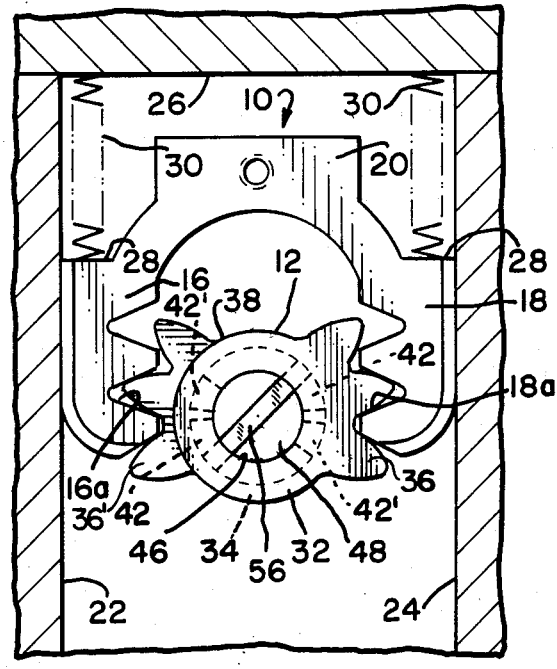
FIG. 3 is a view like that of FIG. 2 which, however, shows the shaft and one gear piece rotated in the clockwise direction and the rack, consequently, translated vertically against the bias of the springs.

With torqued driving rotation of the shaft 42 counter-clockwise, from its FIG. 3 position to its FIG. 2 position, springs 30 return the rack 14 and, consequently, pinion pieces 32 and 34 to the normal or at rest positions thereof as depicted in FIG. 2. Of course, then, with a torqued rotation of the shaft 48 in a counter-clockwise direction, the "eleven o'clock" and "five o'clock" abutments 42' of the foremost section 38 of pinion piece 32 are carried by the ends of the pin 56 in the same direction. The teeth 36 of the foremost section 38, in mesh with the teeth of surface 18a, rotate counter-clockwise and thrust the rack 14 upwardly against the bias of the springs 30. In this alternate action, the ends of the pin 56 rotate away from the "one o'clock" and "seven o'clock" abutments 42 of the underlying pinion piece 34. Here too, however, with the rack 14 being moved upwardly, the underlying section 38 of pinion piece 34 is rotated, on the shaft 48, in the clockwise direction.

As earlier suggested, this novel rack and pinion assembly 10 finds a ready application in door trim.

Figure 4:
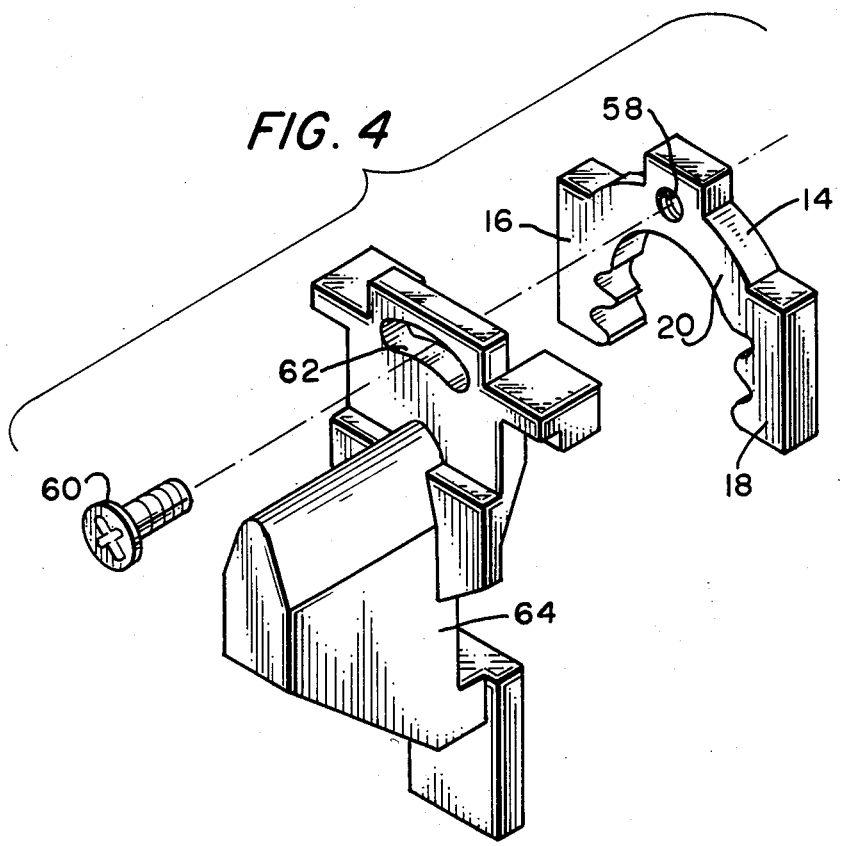
FIGS. 4 and 5 show the employment of the novel rack and pinion assembly in a door exit or latching mechanism.
Figure 5:
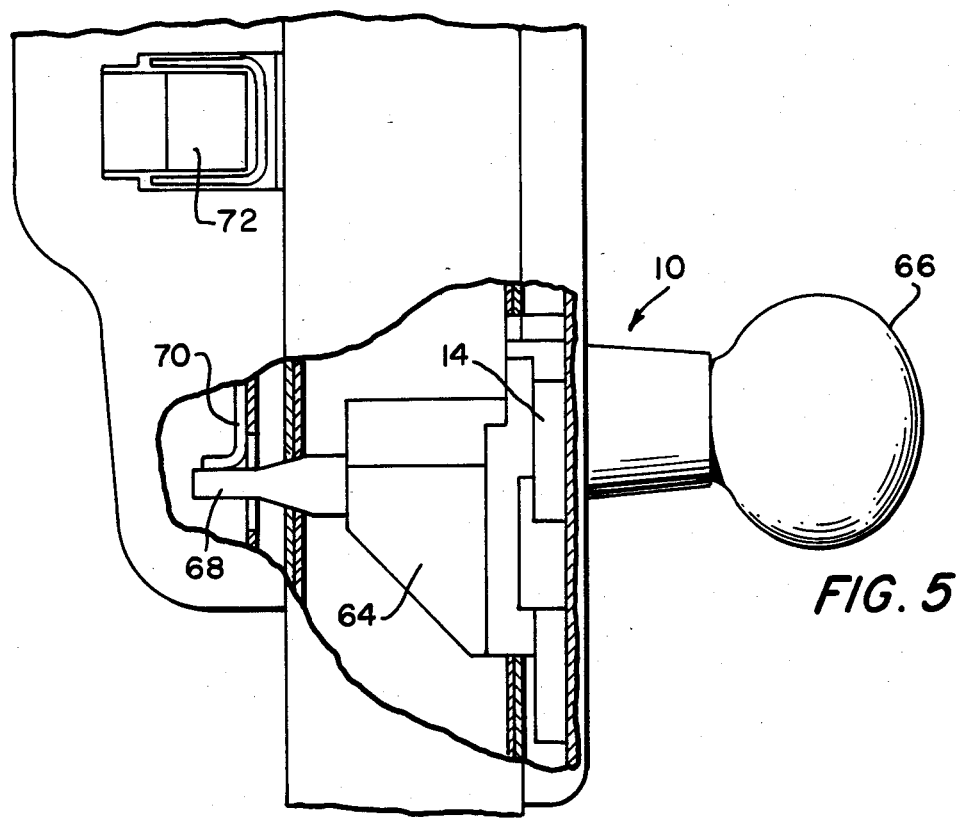

FIG. 4 shows only the rack 14 of the assembly 10, the rest of the structure being understood from the foregoing description and from FIGS. 1-3. Web 20 of the rack 14 has a tapped hole 58 formed therein to receive the machine screw 60 which, via a slot 62, fixes a slider 64 thereto. Now, FIG. 5 shows the assembly 10, with a door knob 66 fixed to the shaft 48 (by means not shown) for giving the shaft a torqued, driving rotation, and the slider 64 fastened to the rack 14.

The slider 64 has a limb 68 extending therefrom which contacts a linkage 70 which, in turn, is translatable to effect retraction of the latch bolt 72.

With the knob 66 held fast to the shaft 48, its rotation in either direction will raise the rack 14. Thus, the novel assembly contributes its mechanical advantage to the using door trim, and translates the rack 14 in only one direction however the knob 66 (and shaft 48) is turned.

While we have described our invention in connection with a specific embodiment thereof, it is to be clearly understood that this is done only by way of example, and not as a limitation to the scope of our invention as set forth in the objects thereof and in the appended claims.

We claim:

1. A rack and pinion assembly, comprising:
a guide; and
a rack slidably engaged with said guide; wherein said guide comprises means for constraining said rack to linear motion thereof relative to said guide;
pinion means, drivingly engaged with said rack, for causing linear translation of said rack coincident with rotation of said pinion means;
a shaft, (a) disposed for torqued, driving rotation thereof about an axis in clockwise and counter-clockwise directions, and (b) comprising means for causing a driven rotation of said pinion means coincident with, and as a consequence of, rotation of sai shaft; and
means coupling said shaft and said pinion means together for transmitting torqued rotation of said shaft to said pinion means; wherein
said pinion means and said coupling means comprise means cooperative for causing said rack to translate in only one direction in response to rotation of said shaft in (a) a clockwise direction, and/or (b) a counter-clockwise direction.

2. A rack and pinion assembly, according to claim 1, wherein:
said pinion means comprises a pinion gear of two, mating pieces;
each of said pieces comprises an annulus having a plurality of teeth formed thereon.

3. A rack and pinion assembly, according to claim 2, wherein:
said rack is substantially U-shaped, having a pair of substantially parallel limbs having mutually confronting surfaces, and a web integral with, and bridgingly joining said limbs;
said confronting surfaces each have a plurality of teeth formed thereon; and
said teeth of one of said pieces are drivingly meshed with said teeth of one of said confronting surfaces, and said teeth of the other of said pieces are drivingly meshed with said teeth of the other of said confronting surfaces.

4. A rack and pinion assembly, according to claim 2, wherein:
said mating pieces of said gear are rotatably journalled on said shaft.

5. A rack and pinion assembly, according to claim 1, wherein:
said rack is slidably disposed relative to said guide, as aforesaid, for movement in said one direction in response to rotation of said shaft; and further including
a bearing surface; and
means interposed between said bearing surface and said rack biasing said rack against movement in said one direction.

6. A rack and pinion assembly, according to claim 5, wherein:
said biasing means comprises compression springs.

7. A rack and pinion assembly, according to claim 1, wherein:
said coupling means is confined within said pinion means.

8. A rack and pinion assembly, according to claim 1, wherein:
said pinion comprises a pinion gear formed of a plurality of mating pieces; and
said pieces of said plurality are identical.

9. A rack and pinion assembly, according to class 8, wherein:
said pieces of said plurality are just two in number.

10. A rack and pinion assembly, comprising:
a guide; and
a rack slidably engaged with said guide; wherein said guide comprises means for constraining said rack to linear motion thereof relative to said guide;
pinion means, drivingly engaged with said rack, for causing linear translation of said rack coincident with rotation of said pinion means;

a shaft, rotatable about an axis in clockwise and counter-clockwise directions, for causing rotation of said pinion means coincident with rotation of said shaft; and means coupling said shaft and said pinion means together for imparting any rotation of said shaft to said pinion means; wherein said pinion means and said coupling means comprise means cooperative for causing said rack to translate in only one direction in response to rotation of said shaft in (a) a clockwise direction, and/or (b) a counter-clockwise direction;

said pinion means comprises a pinion gear of two, mating pieces;

each of said pieces comprises an annulus having a plurality of teeth formed thereon;

said pinion means, coupling means, and said rack comprise means which cooperate to cause one of said mating pieces to rotate in common with said shaft, and to cause the other of said mating pieces to rotate counter to rotation of said shaft.

11. A rack and pinion assembly, comprising:

a guide; and a rack slidably engaged with said guide; wherein said guide comprises means for constraining said rack to linear motion thereof relative to said guide;

pinion means, drivingly engaged with said rack, for causing linear translation of said rack coincident with rotation of said pinion means;

a shaft, rotatable about an axis in clockwise and counter-clockwise directions, for causing rotation of said pinion means coincident with rotation of said shaft; and means coupling said shaft and said pinion means together for imparting any rotation of said shaft to said pinion means; wherein said pinion means and said coupling means comprise means cooperative for causing said rack to translate in only one direction in response to rotation of said shaft in (a) a clockwise direction, and/or (b) a counter-clockwise direction;

said pinion means comprises a pinion gear having a substantially annular recess, with a peripheral wall, formed therein;

said pinion gear further having abutments extending, inwardly, relative to said pinion gear, and projectingly from said peripheral wall; and said coupling means comprises a pin, set in said shaft in traverse of said axis, for contacting engagement thereof with said abutments.

12. A rack and pinion assembly, comprising:

a guide; and a rack slidably engaged with said guide; wherein said guide comprises means for constraining said rack to linear motion thereof relative to said guide;

pinion means, drivingly engaged with said rack, for causing linear translation of said rack coincident with rotation of said pinion means;

a shaft, rotatable about an axis in clockwise and counter-clockwise directions, for causing rotation of said pinion means coincident with rotation of said shaft; and means coupling said shaft and said pinion means together for imparting any rotation of said shaft to said pinion means; wherein said pinion means and said coupling means comprise means cooperative for causing said rack to translate in only one direction in response to rotation of said shaft in (a) a clockwise direction, and/or (b) a counter-clockwise direction;

said pinion comprises a pinion gear formed of a plurality of mating pieces;

said pieces of said plurality are identical;

each piece of said plurality thereof comprises an annulus;

each said annulus having an annular recess formed therein;

said recess having a peripheral wall;

said wall being interrupted by a pair of abutments extending therefrom; and said annulus further having a plurality of teeth projecting therefrom.

13. A rack and pinion assembly, according to claim 12, wherein:

said annulus has a given thickness; and said teeth have a thickness differing from said given thickness.

14. A rack and pinion assembly, according to claim 13, wherein:

said given thickness is substantially half said differing thickness.

15. A rack and pinion assembly, according to claim 12, wherein:

said coupling means comprises a pin, set in said shaft in traverse of said axis, for contacting engagement thereof with said abutments;

said pin has a given thickness; and said recess has a depth of substantially half said given thickness.

* * * * *